(12) United States Patent
Tazume

(10) Patent No.: US 12,332,653 B2
(45) Date of Patent: Jun. 17, 2025

(54) DELIVERY SYSTEM, DELIVERY METHOD AND DELIVERY DEVICE

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 666 days.

(21) Appl. No.: 17/252,734

(22) PCT Filed: Nov. 28, 2019

(86) PCT No.: PCT/JP2019/046654
§ 371 (c)(1),
(2) Date: Dec. 16, 2020

(87) PCT Pub. No.: WO2021/106166
PCT Pub. Date: Jun. 3, 2021

(65) Prior Publication Data
US 2021/0373569 A1    Dec. 2, 2021

(51) Int. Cl.
*G05D 1/00* (2024.01)
*B60P 3/00* (2006.01)
(Continued)

(52) U.S. Cl.
CPC ............ *G05D 1/0248* (2013.01); *B60P 3/007* (2013.01); *G05D 1/0094* (2013.01); *G06V 20/56* (2022.01);
(Continued)

(58) Field of Classification Search
CPC ..... G05D 1/0248; G05D 1/0094; B60P 3/007; G06V 20/56; G06V 40/172;
(Continued)

(56) References Cited

U.S. PATENT DOCUMENTS 11,567,511 B1 *   1/2023  Scott ................. B60L 50/40
2017/0330144 A1 * 11/2017 Wakim ................ H04W 4/023
(Continued)

FOREIGN PATENT DOCUMENTS

CN    108364143 A    8/2018
CN    109689544 A    4/2019
(Continued)

OTHER PUBLICATIONS

Office Action of Jun. 15, 2021, for corresponding JP Patent Application No. 2020-043083 with partial English translation pp. 1-3.
(Continued)

*Primary Examiner* — Faris S Almatrahi
*Assistant Examiner* — Dana F Artimez
(74) *Attorney, Agent, or Firm* — HEA Law PLLC

(57) ABSTRACT

For a user to receive a package more smoothly from an unmanned ground vehicle, a delivery system includes an unmanned ground vehicle having at least two surfaces each of which is provided with a door of a storage compartment for receiving a package and facing in different directions. The delivery system determines a surface provided with a door of a storage compartment that stores a package to be received by the user next among the at least two surfaces, and adjusts a direction of the unmanned ground vehicle based on the determined surface before the user reaches the unmanned ground vehicle.

12 Claims, 12 Drawing Sheets

(51) Int. Cl.
*G06V 20/56* (2022.01)
*G06V 40/16* (2022.01)

(52) U.S. Cl.
CPC ........ *G06V 40/172* (2022.01); *G06V 2201/07* (2022.01)

(58) Field of Classification Search
CPC ........ G06V 2201/07; B60W 60/00256; B60W 2420/42; G06Q 10/083
See application file for complete search history.

(56) References Cited

U.S. PATENT DOCUMENTS

| | | | |
|---|---|---|---|
| 2018/0079607 A1 | 3/2018 | Shibata et al. | |
| 2018/0157263 A1* | 6/2018 | Goepner | G05D 1/0251 |
| 2019/0041864 A1* | 2/2019 | Konishi | G06Q 50/28 |
| 2019/0137290 A1* | 5/2019 | Levy | G05D 1/0276 |
| 2019/0220811 A1* | 7/2019 | Naito | B60P 1/02 |
| 2019/0236538 A1 | 8/2019 | Kaneko et al. | |
| 2019/0318159 A1* | 10/2019 | Blanc-Paques | G06Q 50/30 |
| 2021/0370989 A1* | 12/2021 | Morimura | G06Q 10/08355 |

FOREIGN PATENT DOCUMENTS

| | | |
|---|---|---|
| CN | 209038350 U | 6/2019 |
| JP | H01141182 A | 6/1989 |
| JP | H02100913 A | 4/1990 |
| JP | H0977212 A | 3/1997 |
| JP | 2018043879 A | 3/2018 |
| JP | 2018058656 A | 4/2018 |
| JP | 2019131361 A | 8/2019 |

OTHER PUBLICATIONS

Office Action of May 27, 2022, for corresponding CN Patent Application No. 201980045716.4 with partial English translation pp. 1-21.

* cited by examiner

DELIVERY SYSTEM, DELIVERY METHOD AND DELIVERY DEVICE

CROSS REFERENCE TO RELATED APPLICATIONS

This application is a National Stage of International Application No. PCT/JP2019/046654 filed on Nov. 28, 2019. The contents of the above document is incorporated herein by reference in its entirety.

TECHNICAL FIELD

The present invention relates to a delivery system, a delivery method, and a delivery device.

BACKGROUND ART

Unmanned ground vehicles (hereinafter also referred to as UGV) allow delivery of packages from a delivery base to a delivery destination, such as a residence. When a UGV arrives at the destination, a recipient receives a package stored in the UGV.

JP2018-58656A describes that, when receiving a package stored in a side door of the unmanned ground vehicle, a user inputs an authentication key, and if it is determined that the recorded delivery command matches the entered user authentication key, the unmanned ground vehicle opens the door in which the package for the user is accommodated.

SUMMARY OF INVENTION

Technical Problem

It is conceivable to provide doors for receiving packages on a plurality of surfaces forming the unmanned ground vehicle. In a case where such an unmanned ground vehicle waits at a delivery destination and a user then receives a package, some troubles may occur in unloading the package depending on the position where the unmanned ground vehicle waits.

One or more embodiments of the present invention have been conceived in view of the above, and an object thereof is to provide a technique that enables a user to more smoothly receive a package from an unmanned ground vehicle.

Solution to Problem

In order to solve the above described problems, a delivery system according to one aspect of the present invention includes an unmanned ground vehicle including at least two surfaces provided with a door of a storage compartment for receiving a package, the at least two surfaces facing in different directions from each other, surface estimating means for estimating a surface provided with a door of a storage compartment that stores a package to be received by a user next among the at least two surfaces, and direction adjusting means for adjusting a direction of the unmanned ground vehicle based on the estimated surface before the user reaches the unmanned ground vehicle.

A delivery method according to one aspect of the present invention includes estimating a surface provided with a door of a storage compartment that stores a package to be received by a user next among at least two surfaces forming an outer periphery of the unmanned ground vehicle, the at least two surfaces facing in different directions and provided with a door of a storage compartment for receiving a package, and adjusting a direction of the unmanned ground vehicle based on the estimated surface before the user reaches the unmanned ground vehicle.

A delivery device according to one aspect of the present invention includes at least two surfaces provided with a door of a storage compartment for receiving a package and facing in different directions, surface estimating means for estimating a surface provided with a door of a storage compartment that stores a package to be received by a user next among the at least two surfaces, and direction adjusting means for adjusting a direction of the unmanned ground vehicle based on the estimated surface before the user reaches the unmanned ground vehicle.

In one aspect of the present invention, the delivery system may further include user estimating means for estimating a user who receives a package next at the unmanned ground vehicle. The surface estimating means may obtain, as the estimated surface, a surface provided with a door of a storage compartment that stores a package to be received by the estimated user.

In one aspect of the present invention, the user estimating means may estimate a user who receives a package next at the unmanned ground vehicle based on whether a face of the user is recognized in an image captured by a camera or output from a sensor of a portable device owned by the user.

In one aspect of the present invention, the direction adjusting means may specify a structure around the unmanned ground vehicle and adjust the direction of the unmanned ground vehicle so that a surface different from the estimated surface is adjacent to the specified structure.

In one aspect of the present invention, the direction adjusting means may acquire a direction in which the estimated user arrives and adjust the direction of the unmanned ground vehicle based on the direction in which the estimated user arrives and the estimated surface.

In one aspect of the present invention, the user estimating means may estimate a user who receives a package next at the unmanned ground vehicle after the unmanned ground vehicle arrives at a delivery destination.

In one aspect of the present invention, the direction adjusting means may specify a structure around the unmanned ground vehicle before the unmanned ground vehicle stops at a waiting position in a delivery destination, and adjust the direction of the unmanned ground vehicle so that a surface different from the estimated surface is adjacent to the structure.

Effects of the Invention

According to the present invention, a user can more smoothly receive a package from the unmanned ground vehicle.

DESCRIPTION OF EMBODIMENTS

An embodiment of the present invention will be described below with reference to the accompanying drawings. Regarding the elements designated with the same numerals, their overlapping description will be omitted. In the present embodiment, a package delivery system for delivering a package to a delivery destination, such as an apartment house in which a plurality of users reside, will be described.

Figure 1:
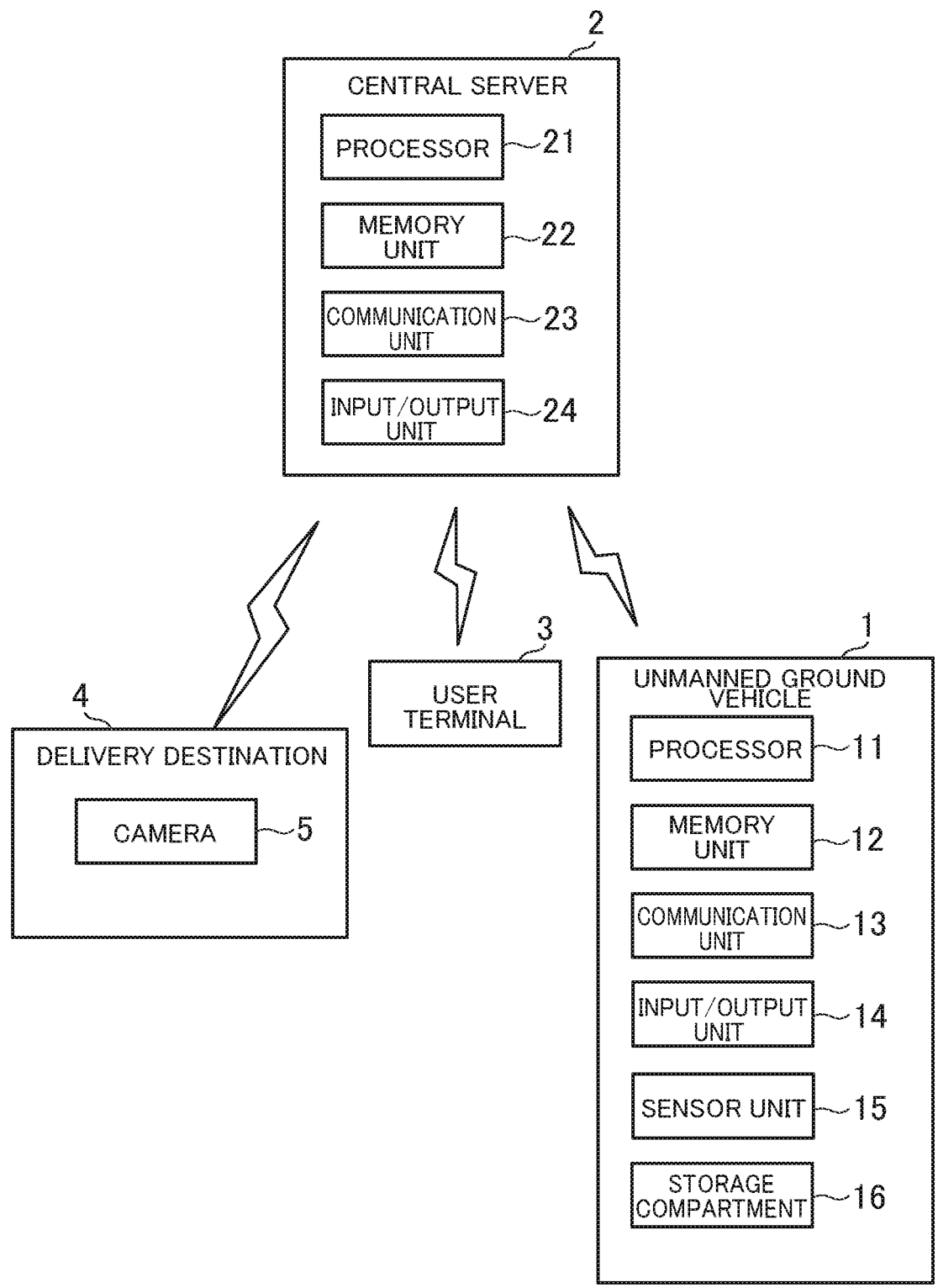
FIG. 1 is a diagram illustrating an example of a configuration of a package delivery system according to an embodiment of the present invention.

FIG. 1 is a diagram illustrating an example of a configuration of a package delivery system according to the embodiment of the present invention. As shown in FIG. 1, the package delivery system includes one or more unmanned ground vehicles 1, a central server 2, a user terminal 3, and one or more cameras 5 provided at a delivery destination 4.

The unmanned ground vehicle 1 is a device that travels on the ground by automatic control and delivers packages without a driver. FIG. 1 shows one unmanned ground vehicle 1, although there may be a plurality of unmanned ground vehicles 1. The unmanned ground vehicle 1 is connected to the central server 2 via wireless communication. The wireless communication may be based on a communication standard such as LTE (Long Term Evolution).

The central server 2 communicates with and controls the unmanned ground vehicle 1 and the user terminal 3. The central server 2 acquires information on the user's behavior from the user terminal 3 or the camera 5 as needed. There is a delivery base (not shown) where a package for the user is stored in the unmanned ground vehicle 1.

Figure 2:
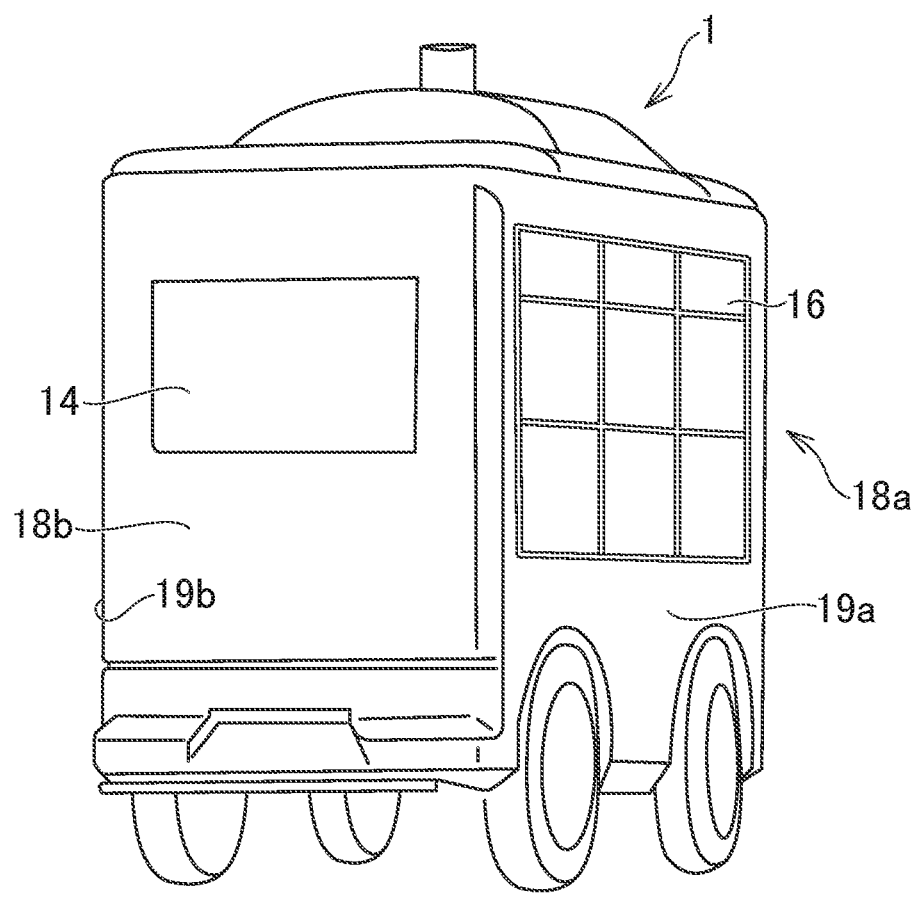
FIG. 2 is a perspective view of an example of an unmanned ground vehicle.

FIG. 2 is a perspective view showing an example of the unmanned ground vehicle 1. As shown in FIGS. 1 and 2, the unmanned ground vehicle 1 includes a processor 11, a memory unit 12, a communication unit 13, an input-output unit 14, a sensor unit 15, a plurality of storage compartments 16, and a drive unit (not shown).

The processor 11 executes processing in accordance with programs and data stored in the memory unit 12. The processor 11 controls the communication unit 13, the input-output unit 14, the sensor unit 15, and the storage compartments 16.

The memory unit 12 includes a volatile memory, such as RAM, and a nonvolatile memory, such as flash memory. The memory unit 12 may also include a storage device, such as a hard disk. The memory unit 12 stores the programs. The memory unit 12 stores information and calculation results entered from the processor 11, the communication unit 13, and the input-output unit 14. The programs may be provided via the Internet, for example, or may be stored in a computer-readable storage medium such as a flash memory so as to be provided.

The communication unit 13 includes an integrated circuit, for example, for implementing a communication interface for wireless communication. The communication unit 13 inputs information received from another device to the processor 11 and memory unit 12 under the control of the processor 11, and transmits the information to another device.

The input-output unit 14 includes a display output device, an input device, and an interface therewith. Specifically, the input-output unit 14 is a touch panel with a display (hereinafter, referred to as an "input panel") and is used to input a receipt code for authentication. The input-output unit 14 may be a display and physical buttons, or other types of display output devices and input devices. The input-output unit 14 displays an image on the display output device based on the control of the processor 11, and acquires data entered by the user from the input device. The sensor unit 15 includes a lidar and a camera that recognize sizes and positions of surrounding obstacles.

The plurality of storage compartments 16 are areas for storing packages. The unmanned ground vehicle 1 includes, on its outer periphery, side surfaces 19a and 19b opposed to each other where the doors of the storage compartments 16 are disposed, an end part 18b, which is a surface facing a different direction from the side surfaces 19a and 19b and on which the input-output unit 14 is disposed, and an end part 18a, which is a surface opposed to the end part 18b.

The side surfaces 19a and 19b of the unmanned ground vehicle 1 each include a plurality of storage compartments 16. Each of the storage compartments 16 has a door, and the door is provided with a key. The storage compartment 16 also includes a circuit for electrically controlling locking and unlocking the key, and a sensor for detecting a package is provided inside the storage compartment. The lidar is provided on the upper surface of the unmanned ground vehicle 1, and the camera (not shown) is provided on the end part 18a.

The central server 2 includes a processor 21, a memory unit 22, a communication unit 23, and an input-output unit 24. The central server 2 may be a single physical server or may be composed of several physical servers, as in the so-called cloud.

The processor 21 executes processing according to programs or data stored in the memory unit 22. The processor 21 controls the communication unit 23 and the input-output unit 24.

The memory unit 22 includes a volatile memory such as RAM, a nonvolatile memory such as flash memory, and a storage device such as hard disk. The memory unit 22 stores the programs. The memory unit 22 stores information and calculation results entered from the processor 21, the communication unit 23, and the input-output unit 24. The programs may be provided via the Internet, for example, or may be stored in a computer-readable storage medium such as a flash memory so as to be provided.

The communication unit 23 includes an integrated circuit, for example, for implementing a communication interface for wired communication. The communication unit 23 inputs information received from another device to the processor 21 and memory unit 22 under the control of the processor 21, and transmits the information to another device. The communication unit 23 may communicate with the unmanned ground vehicle 1 via a communication network and a wireless communication device included in the communication network.

The input-output unit 24 includes a video controller that controls display and a controller that acquires data from an input device, for example. Examples of the input device include a touch panel, a keyboard, and a mouse. The input-output unit 24 outputs display data to the display output device under the control of the processor 21, and acquires the data entered by the user operating the input device.

The user terminal 3 is a device owned by the user, such as a smart phone. The user terminal 3 includes a GPS sensor and an acceleration sensor, for example, and can detect the operation of the user.

One or more cameras 5 disposed in the delivery destination 4 are, for example, surveillance cameras disposed in a passage of an apartment house, and has a communication function. The camera 5 captures an image, and transmits the captured image to the central server 2 via a communication line. The camera 5 may have a face recognition function for recognizing the user. In this case, the user recognized by the face may be transmitted to the central server 2 or the unmanned ground vehicle 1. A management server that manages the camera 5 may be disposed in the delivery destination 4, and perform face recognition using the image captured by the camera 5.

An overview of a case where a user orders a product and a package containing the product is delivered to the user will be described. The package containing the product is transported from a warehouse where the product is stored to a delivery base. At the delivery base, for example, an employee of the delivery base stores the package for the user in the unmanned ground vehicle 1 based on an instruction from the central server 2. The unmanned ground vehicle 1 may store a plurality of packages for a plurality of users who reside in a single apartment house (corresponding to the delivery destination 4). The unmanned ground vehicle 1 storing the packages moves to the delivery destination 4 based on the instruction of the central server 2. When the unmanned ground vehicle 1 arrives at the waiting area of the delivery destination 4 (e.g., the entrance of the apartment house), the central server 2 sends a notification to the user to notify the arrival with authentication information. The authentication information is used to authenticate the user at the time of receipt of the package. When the user moves toward and reaches the unmanned ground vehicle 1, the user inputs the authentication information to the input-output unit 14 of the unmanned ground vehicle 1. When the user is authenticated by the authentication information, the unmanned ground vehicle 1 unlocks the door of the storage compartment 16 that stores the package for the user, and the user receives the package from the storage compartment 16. In this embodiment, the direction of the unmanned ground vehicle 1 is adjusted prior to the arrival of the user so that the user can easily receive the package. In the following, this method will be described in more detail.

Figure 3:
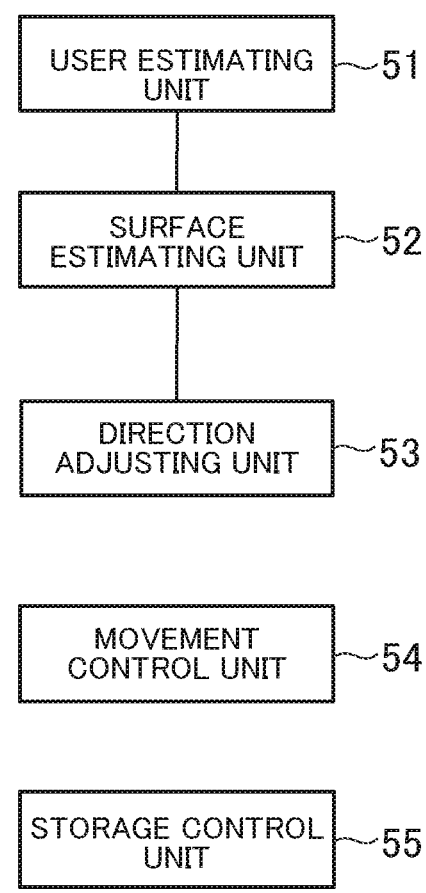
FIG. 3 is a block diagram showing functions implemented in the package delivery system.

FIG. 3 is a block diagram showing functions implemented by the package delivery system. The package delivery system functionally includes a user estimating unit 51, a surface estimating unit 52, a direction adjusting unit 53, a movement control unit 54, and a storage control unit 55. These functions are implemented when the processor 11 included in the unmanned ground vehicle 1 executes the programs stored in the memory unit 12 and controls the communication unit 13, the input-output unit 14, and the sensor unit 15. The functions of the user estimating unit 51 and the surface estimating unit 52 and some of the functions of the direction adjusting unit 53, the movement control unit 54, and the storage control unit 55 may be implemented when the processor 21 included in the central server 2 executes the programs stored in the memory unit 22 and controls the communication unit 23, or may be implemented when the processors 21 included in the servers execute the programs stored in the memory unit 22 and control the communication unit 23.

The user estimating unit 51 estimates a user who receives a package at the unmanned ground vehicle 1. More specifically, the user estimating unit 51 estimates a user who receives a package next at the unmanned ground vehicle 1 based on whether the user's face is recognized from the image captured by the camera 5 or the output from the sensor of the user terminal 3 owned by the user. The user estimating unit 51 may estimate the user after the unmanned ground vehicle 1 arrives at the waiting area of the delivery destination 4 and starts waiting.

The surface estimating unit 52 estimates a surface provided with the door of the storage compartment 16 that stores the package to be received next by the user among the surfaces forming the outer periphery of the unmanned ground vehicle 1. More specifically, the surface estimating unit 52 acquires, as the estimated surface, a surface provided with the door of the storage compartments 16 that stores the package to be received by the user estimated by the user estimating unit 51.

The direction adjusting unit 53 adjusts the direction of the unmanned ground vehicle 1 based on the estimated surface before the user who is receiving the package reaches the unmanned ground vehicle 1. More specifically, the direction adjusting unit 53 specifies, for example, a structure (e.g., wall) around the unmanned ground vehicle 1 and adjusts the direction of the unmanned ground vehicle 1 so that the surface different from the estimated surface is adjacent to the specified structure. The direction adjusting unit 53 may acquire a direction in which the estimated user arrives, and adjust the direction of the unmanned ground vehicle 1 based on the arrival direction and the estimated surface.

The movement control unit 54 controls the movement of the unmanned ground vehicle 1 from the delivery base to the delivery destination 4 and the movement from the delivery destination 4 to the delivery base based on data acquired by the lidar and the GPS of the unmanned ground vehicle 1. The movement control unit 54 may control the movement based on data acquired by the camera attached to the unmanned ground vehicle 1. Some of the functions of the movement control unit 54 may be implemented by the server computer.

The storage control unit 55 controls delivery of packages stored in the storage compartments 16 of the unmanned ground vehicle 1 to the users. More specifically, the storage control unit 55 receives the authentication information entered by the user from the input-output unit 14. When the unmanned ground vehicle 1 authenticates the user based on the authentication information, the storage control unit 55 unlocks the key to the storage compartment 16 (strictly, the key to the door of the storage compartment 16) that stores the package for the authenticated user. The storage control unit 55 also detects whether the package in the storage compartment 16 has disappeared (whether the user has received the package) based on the output of the sensor provided in the storage compartment 16. When detecting that the user has received the package, the storage control unit 55 sends delivery completion information to the central server 2 indicating that the user has received the package. The central server 2 sends a delivery completion notification to the user based on the delivery completion information.

Figure 4:
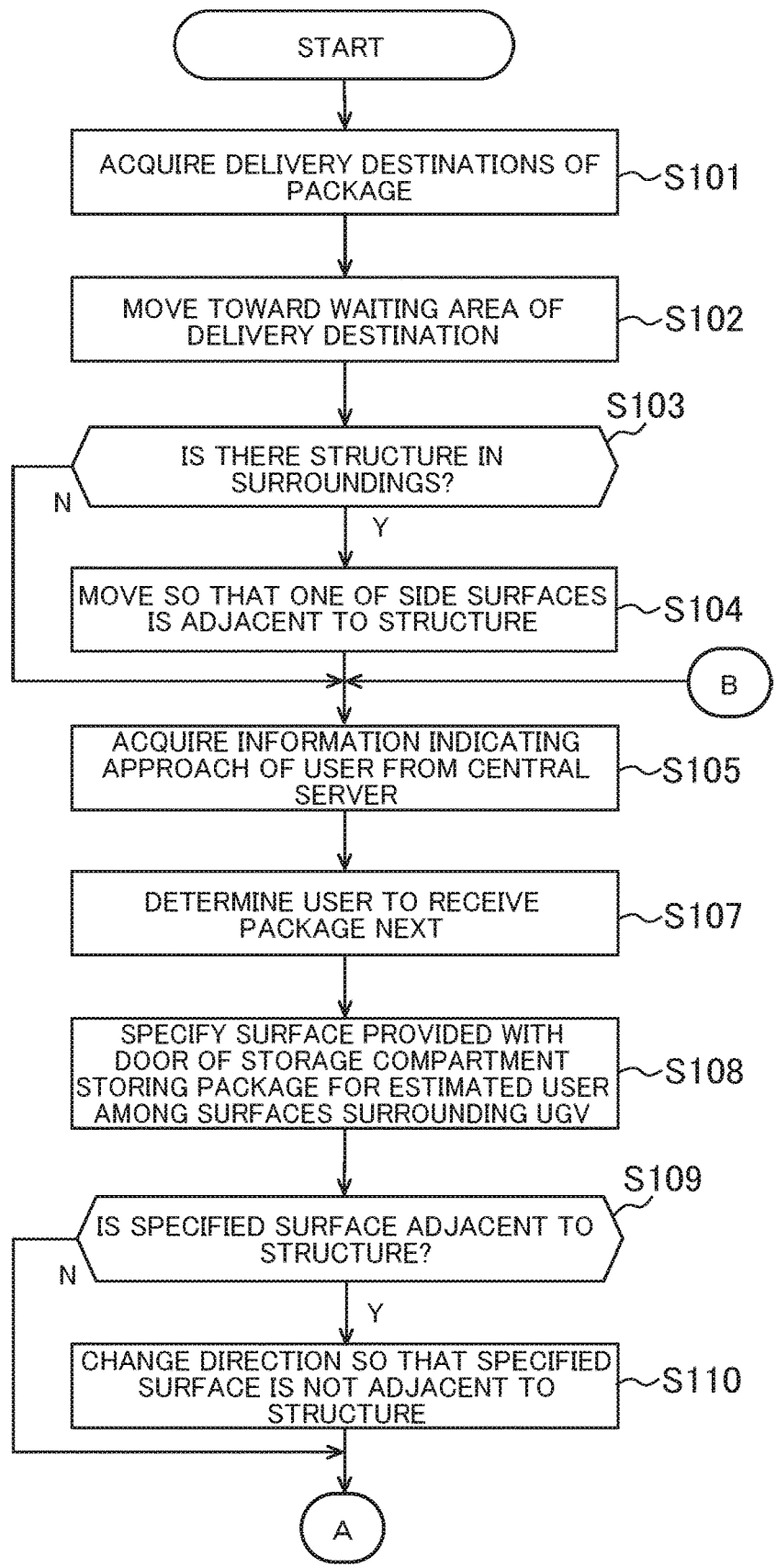
FIG. 4 is a flow chart showing an example of processing of the unmanned ground vehicle.
Figure 5:
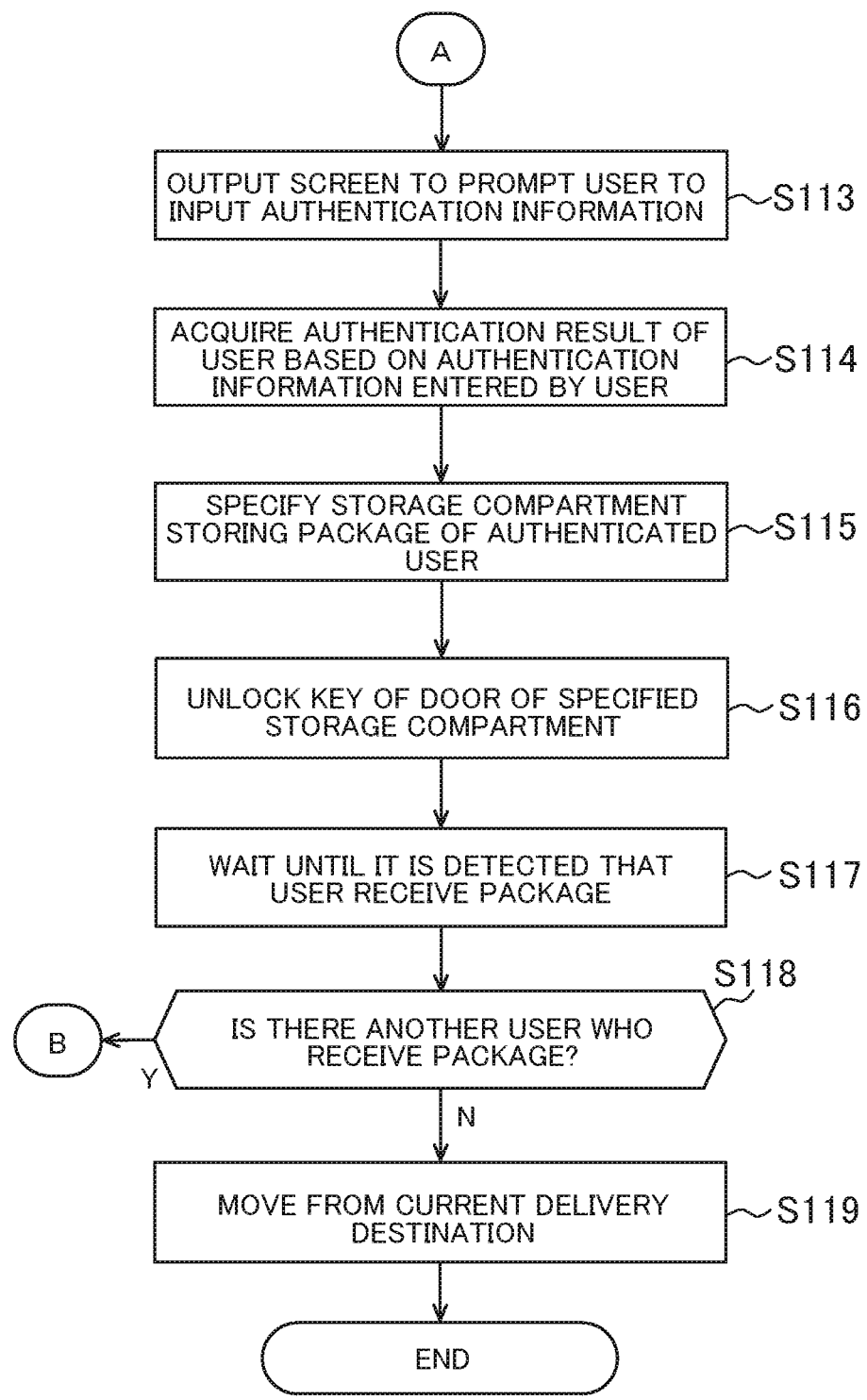
FIG. 5 is a flow chart showing an example of processing of the unmanned ground vehicle.

FIGS. 4 and 5 are flow charts showing examples of processing of the unmanned ground vehicle 1. The processing shown in FIGS. 4 and 5 is executed in a condition in which a plurality of packages are stored in the storage compartments 16 of the unmanned ground vehicle 1, and the memory unit 12 stores the users to whom the packages respectively stored in the storage compartments 16 are delivered.

First, the movement control unit 54 acquires the delivery destinations 4 of the packages stored in the storage compartments (step S101). Here, the delivery destinations 4 of the packages may be the same, or the delivery destinations 4 of some of the packages may be different. Next, the movement control unit 54 controls the unmanned ground vehicle 1 to move toward the waiting area of the acquired delivery destination 4 (step S102).

When the unmanned ground vehicle 1 arrives at the waiting area of the delivery destination 4, the direction adjusting unit 53 determines whether there is a structure around the unmanned ground vehicle 1 (e.g., a radius of 1.5 m) using the lidar and/or the camera included in the sensor unit 15 (step S103). If there is a structure in the surroundings (Y in step S103), the direction adjusting unit 53 moves the unmanned ground vehicle 1 so that one of the side surfaces 19*a* and 19*b* of the unmanned ground vehicle 1 is adjacent to the structure (step S104). More specifically, in step S104, the direction adjusting unit 53 moves the unmanned ground vehicle 1 so that the input-output unit 14 is not adjacent to the structure and one of the side surfaces 19*a* and 19*b* is adjacent to the structure. On the other hand, if there is no structure around the unmanned ground vehicle 1 (N in step S103), the step S104 is skipped. The unmanned ground vehicle 1 then starts waiting, and transmits such information to the central server 2. The central server 2 transmits to the user a notification indicating the arrival of the unmanned ground vehicle 1.

Figure 6:
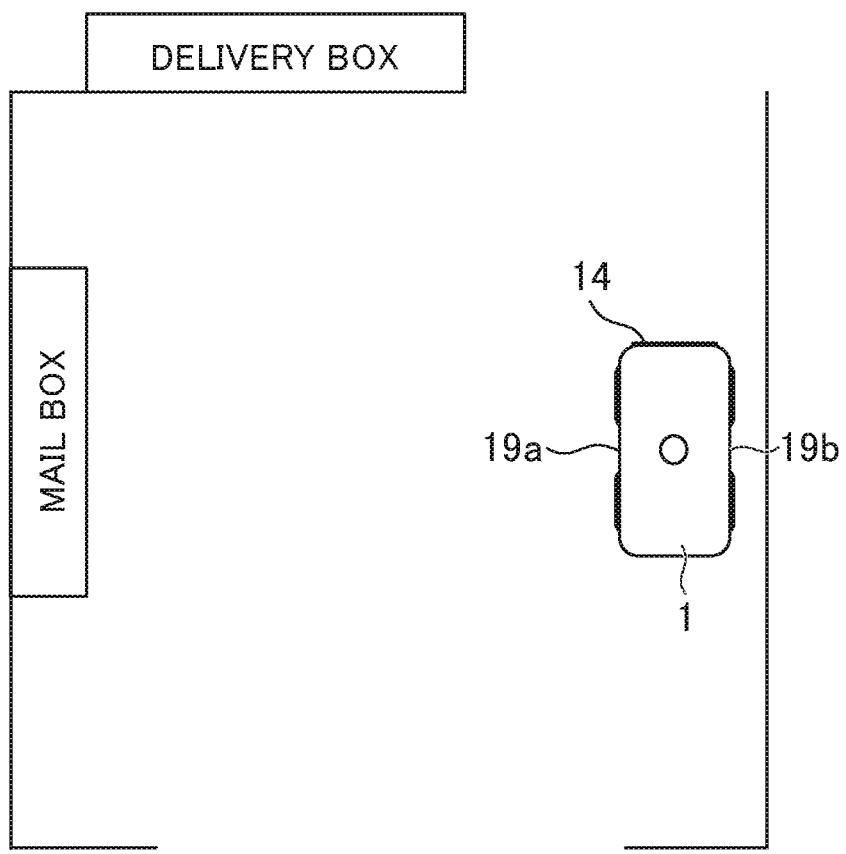
FIG. 6 is a diagram illustrating an example of arrangement of the unmanned ground vehicle in a delivery destination.

FIG. 6 is a diagram showing an example of the arrangement of the unmanned ground vehicle 1 in the delivery destination 4. In the example of FIG. 6, the unmanned ground vehicle 1 is moved so that the side surface 19*b* is adjacent to a wall, which is the structure. The operations of the steps S103 and S104 allow a passenger to walk by smoothly while the unmanned ground vehicle 1 is waiting.

When the waiting starts, the user estimating unit 51 acquires information indicating the approach of the user from the central server 2 (step S105). This processing is implemented not only by the unmanned ground vehicle 1 but also by the central server 2. More specifically, the user terminal 3 transmits the output of the acceleration sensor and the GPS sensor to the central server 2, and the processor 21, which executes the program in the central server 2, estimates the movement direction and the position of the user based on the output of the acceleration sensor and the GPS sensor. The processor 21 transmits, to the unmanned ground vehicle 1, the movement direction and the position of the user to whom the package stored in the unmanned ground vehicle 1 is delivered, and the user estimating unit 51 acquires the movement direction and the position. The processor 21 may estimate whether the user approaches the unmanned ground vehicle 1, and, if it is determined that the user approaches, may transmit information indicating the approach of the user to the unmanned ground vehicle 1. Further, using the face recognition technique, the processor 21 may determine whether a face of the user to whom the package is delivered is recognized from the image captured by the camera 5 at the delivery destination 4. When the face of the user is recognized, the processor 21 may control the communication unit 23 to transmit information indicating the position of the camera 5 and the authenticated user to the unmanned ground vehicle 1 as the information indicating the approach of the user. The user estimating unit 51 may repeatedly execute step S105 until the information indicating the approach of the user is acquired.

The user estimating unit 51 determines a user who is expected to receive a package next based on the information indicating the approach of the user (step S107). If there is only one approaching user, the user estimating unit 51 may determine that such a user is to receive a package next, and, if there are two or more approaching users, the user estimation unit 51 may determine that a user closest to the unmanned ground vehicle 1 is to receive a package next.

When the user is estimated, the surface estimating unit 52 specifies a surface provided with a door of a storage compartment that stores a package for the estimated user among the surfaces forming the outer periphery of the unmanned ground vehicle 1 and provided with the storage compartments 16 (step S108). More specifically, the unmanned ground vehicle 1 selects the storage compartment 16 that stores the package for the estimated user based on the information, which is stored in memory unit 12, of the users to whom the packages respectively stored in the storage compartments 16 are delivered, and specifies, of the side surfaces 19*a* and 19*b*, the surface provided with the door of the selected storage compartment 16 as the estimated surface.

Based on the detection result of the surroundings acquired by the lidar, the direction adjusting unit 53 determines whether the specified surface is adjacent to the structure (e.g., wall) (step S109). If the specified surface is adjacent to the structure (Y in step S109), the direction adjusting unit 53 changes the direction of the unmanned ground vehicle 1 so that the specified surface is not adjacent to the structure (step S110). More specifically, the direction adjusting unit 53 controls the drive unit to change the direction of the unmanned ground vehicle 1 so that the surface different from the specified surface (e.g., opposite surface) is adjacent to the structure. In this regard, the direction adjusting unit 53 may change the direction of the unmanned ground vehicle 1 so that a surface that is different from either the specified surface or the input-output unit 14, for example, a side surface opposite to the specified side surface, is adjacent to the structure. On the other hand, if the specified surface is not adjacent to the structure (N in step S109), the processing of step S110 is skipped.

Figure 7:
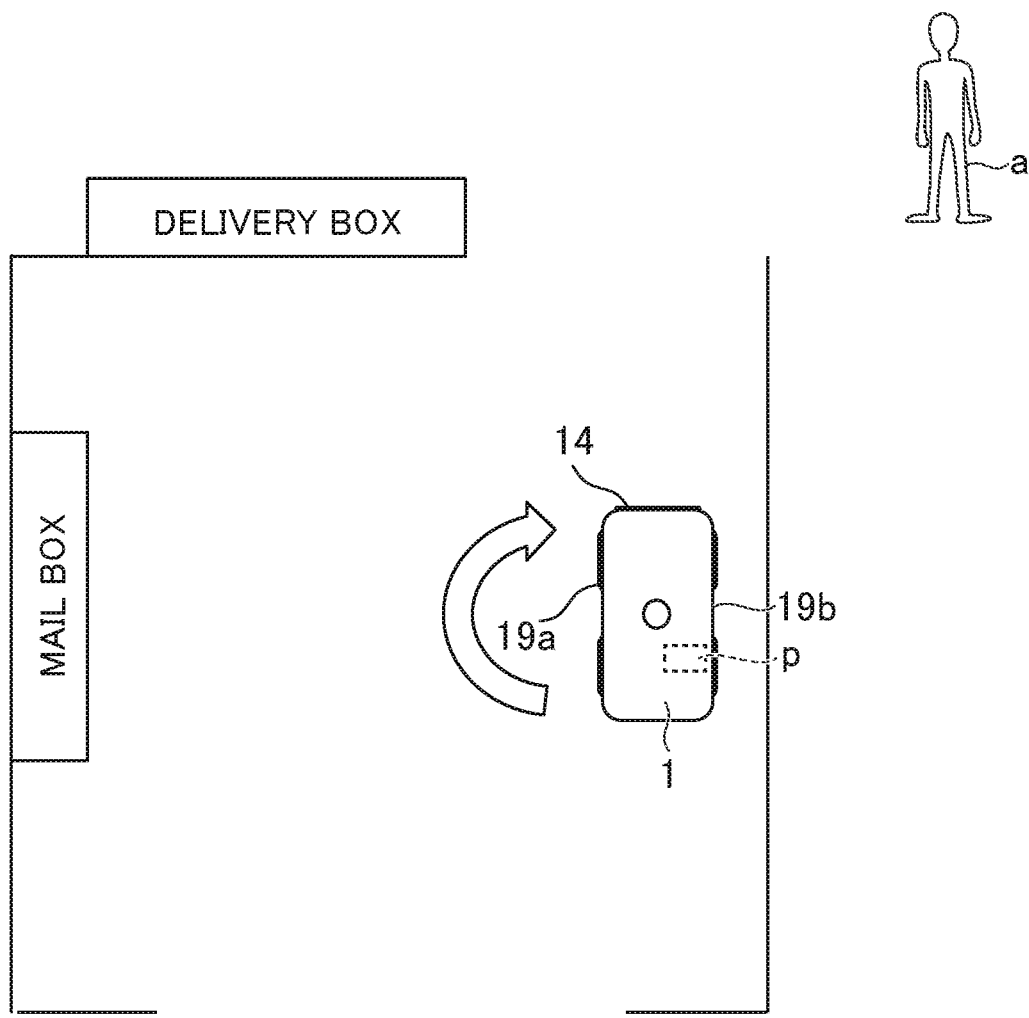
FIG. 7 is a diagram illustrating turning of the unmanned ground vehicle in a delivery destination.
Figure 8:
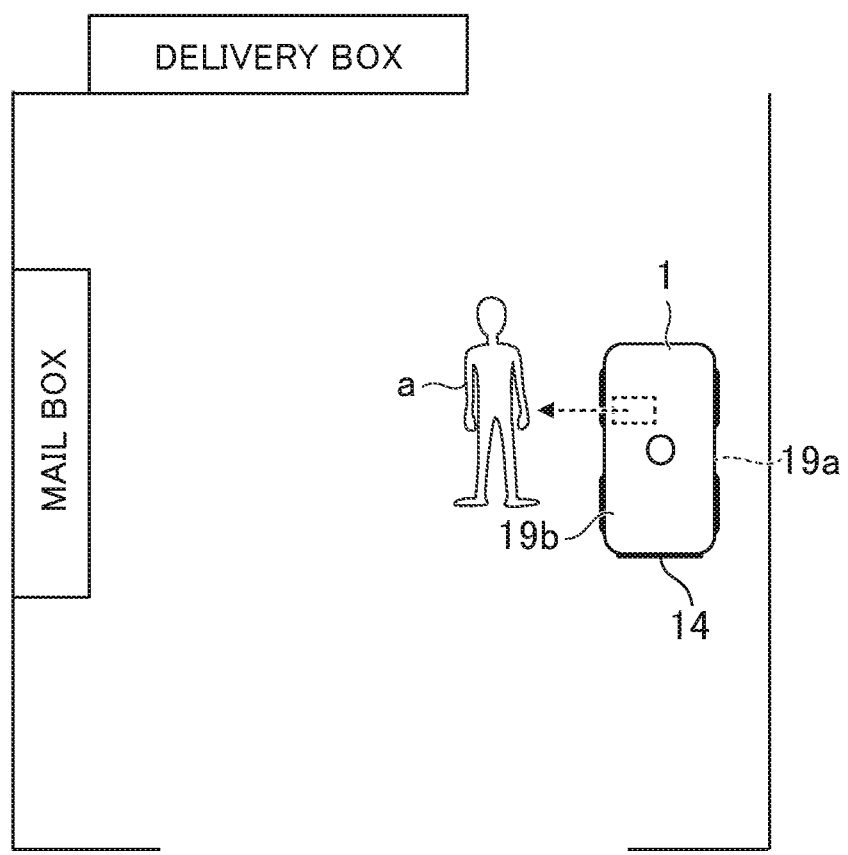
FIG. 8 is a diagram illustrating turning of the unmanned ground vehicle in a delivery destination.

FIGS. 7 and 8 are diagrams illustrating turning of the unmanned ground vehicle 1 in the delivery destination 4. FIG. 7 shows the unmanned ground vehicle 1 before turning. When the user estimating unit 51 estimates that a user a is to receive a package next, the surface estimating unit 52 specifies the side surface 19*b* in which a package p to be delivered to the user a is stored. The specified side surface 19*b* is adjacent to the wall, and thus the direction adjusting unit 53 controls the drive unit to turn the unmanned ground vehicle 1 180 degrees so that the side surface 19*a* opposite to the side surface 19*b* is adjacent to the wall (see FIG. 8).

When the processing of steps S109 and S110 is executed and the user arrives near the unmanned ground vehicle 1 (strictly, when the human detection sensor of the unmanned ground vehicle 1 detects that a person stands in front of the input-output unit 14 of the unmanned ground vehicle 1), the storage control unit 55 controls the input-output unit 14 to output a screen that prompts the user to input the authentication information (e.g., PIN code) (step S113). When the user enters the authentication information according to the display, the storage control unit 55 acquires an authentication result of the user based on the authentication information entered by the user (step S114). This processing may be performed by the storage control unit 55 authenticating the user based on information that verifies the authentication information transmitted from the central server in advance (e.g., information that associates the storage compartments 16 with the PIN code). Alternatively, the storage control unit 55 may transmit the authentication information entered by the user or information obtained by transforming the authentication information (e.g., hash value) to the central server 2, and receive the authentication result of the user from the central server 2.

If the user is authenticated, the storage control unit 55 specifies the storage compartment 16 in which the package for the authenticated user is stored (step S115). Subsequently, the storage control unit 55 unlocks the key to the door of the specified storage compartment 16 (step S116). FIG. 8 shows a case where the user estimated by the user estimating unit 51 receives the package, and in this case, the user a can smoothly take out the package p.

If a user different from the estimated user is authenticated, the direction adjusting unit 53 may perform the processing of steps S109 and S110 after step S116 in order to prevent a trouble relating to receiving of the package of the storage compartment 16.

When the door of the storage compartment 16 is unlocked, the storage control unit 55 waits until the storage control unit 55 detects that the user receives the package (step S117). Upon detecting that the package is received, the storage control unit determines whether there is another user who receives a package stored in the storage compartments 16 at this waiting area (step S118). If there is another user (Y in step S118), the processing of step S105 and subsequent steps is repeated. On the other hand, if there is no other user (N in step S118), the movement control unit 54 moves the unmanned ground vehicle 1 from the current delivery destination 4 to the next delivery destination 4 or the delivery base (step S119).

In this embodiment, as can be seen from the previous discussion, a user who is to receive a package is estimated before the user arrives. Subsequently, the direction of the unmanned ground vehicle 1 is adjusted so that the surface provided with the door of the storage compartment 16 that stores the package for the user is not adjacent to the structure. This allows the user to smoothly take out the package and reduce the time required for receiving the package.

In the examples of FIGS. 4 and 5, the package delivery system does not estimate the user to receive the package prior to starting waiting, although the processing corresponding to steps S113 to S107 may be performed in the movement in steps S103 and S104. In this case, the user estimating unit 51 may estimate all the users who are expected to receive the packages at this delivery destination 4, and the surface estimating unit 52 may count the number of estimated users expected to receive the packages for each of the side surfaces 19a and 19b provided with the doors of the storage compartments 16 in which the packages are stored, and may acquire the surface having the larger number of users as the estimated surface.

Figure 9:
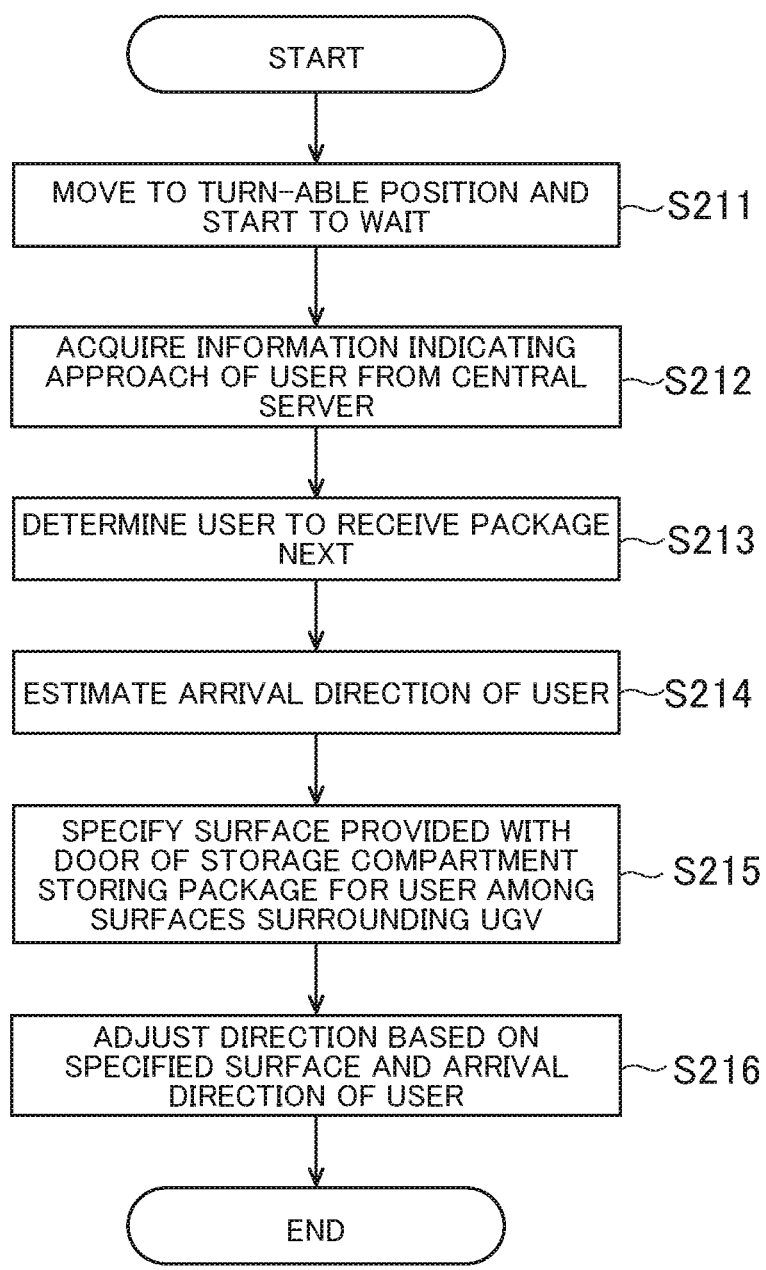
FIG. 9 is a flow chart showing another example of processing of the unmanned ground vehicle.

In the above description, the direction is changed based on the structure and the surface on which the user receives the package, although the direction may not necessarily have to be changed in relation to the structure. FIG. 9 is a flow chart showing another example of processing of the unmanned ground vehicle 1. The processing of FIG. 9 is performed instead of the steps S113 to S103 of FIGS. 4 and 5. In the following, the differences from FIGS. 4 and 5 will be mainly described, and detailed description of the same processing will be omitted.

In the example of FIG. 9, when the unmanned ground vehicle 1 arrives at the waiting area of the delivery destination 4, the movement control unit 54 measures the surrounding structures by a sensor, such as a lidar, and moves the unmanned ground vehicle 1 to a position where the unmanned ground vehicle 1 can turn and start waiting (step S211).

Next, the user estimating unit 51 acquires information indicating that the user is approaching from the central server (step S212). The user estimating unit 51 determines a user who is expected to receive a package next based on the information indicating that the user is approaching (step S213). Further, the user estimating unit 51 estimates a direction (arrival direction) in which the user arrives at the unmanned ground vehicle 1 based on the information indicating that the user is approaching (e.g., position information of the user) (step S214). The user estimating unit 51 may estimate an entrance at which the user enters the waiting area based on the position information of the user and the map information, and may estimate a direction of the entrance as the direction of the arrival of the user.

When the user is estimated, the surface estimating unit 52 specifies a surface provided with the door of the storage compartment 16 that stores the package for the estimated user among the surfaces forming the outer periphery of the unmanned ground vehicle 1 and having the storage compartments 16 (step S215).

The direction adjusting unit 53 adjusts the direction of the unmanned ground vehicle 1 based on the specified surface and the estimated arrival direction (step S216). More specifically, the direction adjusting unit 53 controls the drive unit to change the direction of the unmanned ground vehicle 1 so that the specified surface faces the arrival direction.

Figure 10:
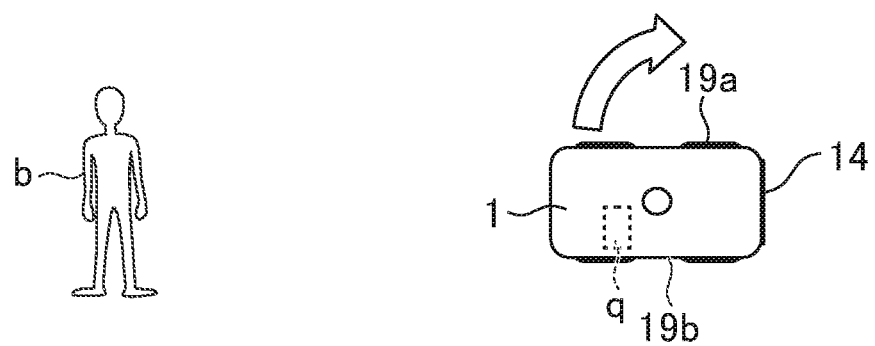
FIG. 10 is a diagram illustrating turning of the unmanned ground vehicle in a delivery destination.
Figure 11:
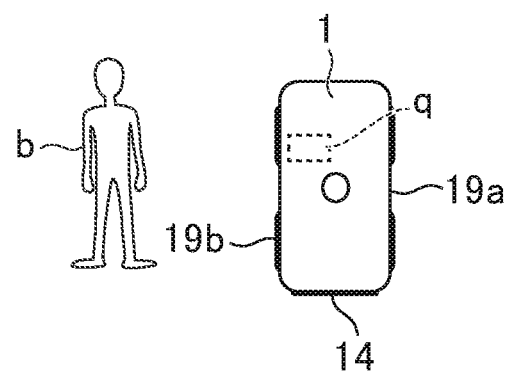
FIG. 11 is a diagram illustrating turning of the unmanned ground vehicle in a delivery destination.

FIGS. 10 and 11 are diagrams illustrating the turning of the unmanned ground vehicle 1 in the delivery destination 4. FIG. 10 shows the unmanned ground vehicle 1 before turning, and FIG. 11 shows the state after turning. In the example of FIGS. 10 and 11, the user b to receive a package comes from the left in the drawings. In this case, the direction adjusting unit 53 turns the unmanned ground vehicle 1 so that the side surface 19b, on which the door of the storage compartment 16 that stores a package q for the user b is provided, faces the arrival direction of the user b. For example, the user b may return in the arrival direction, and thus this turning can reduce the user's extra movement between receiving the package and returning. For this reason, the user can receive the package more smoothly.

The unmanned ground vehicle 1 may simply direct the surface (e.g., the end part 18b) having the input-output unit 14 in the direction of the approaching person without specifying which user arrives. For example, the direction adjusting unit 53 detects whether a person is approaching and the direction in which the person arrives (arrival direction) based on the output of the lidar or the camera equipped in the unmanned ground vehicle 1. When it is detected that a person is approaching, the direction adjusting unit 53 adjusts the direction of the unmanned ground vehicle 1 so that the input-output unit 14 of the unmanned ground vehicle 1 faces in the arrival direction.

Figure 12:
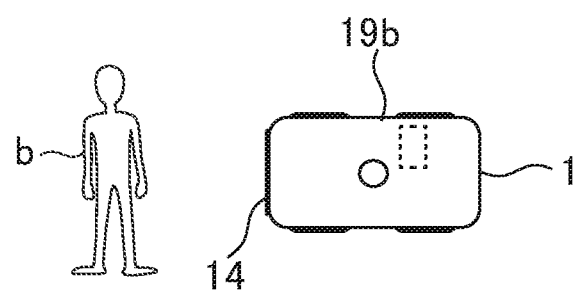
FIG. 12 is a diagram illustrating turning of the unmanned ground vehicle in a delivery destination.

FIG. 12 is a diagram illustrating the turning of the unmanned ground vehicle 1 in the delivery destination 4. The surface having the input-output unit 14 to which the user inputs the authentication information is directed in the user's arrival direction, and the user can thereby smoothly input the authentication information and more easily receive the package. In this regard, a surface other than the input-output unit 14 may face the arrival direction. For example, the surface estimating unit 52 may estimate a surface on which a package is likely to be received based on the arrangement of the doors of the storage compartments 16 of the packages to be delivered in the delivery destination 4, and the direction adjusting unit 53 may adjust so that the estimated surface faces the arrival direction of the person approaching.

The invention claimed is:

1. A delivery system comprising:
   an unmanned ground vehicle including a first surface and a second surface, the first surface provided with a first door of a first storage compartment, the second surface provided with a second door of a second storage compartment, the first surface and the second surface facing in different directions from each other;
   wherein the first storage compartment and the second storage compartment are collectively configured to receive a plurality of packages; and
   at least one processor; and
   at least one memory device that stores a plurality of instructions which, when executed by the at least one processor, causes the at least one processor to:
   estimate a next user who receives, at a delivery destination, a package from among the plurality of packages from the unmanned ground vehicle as a closest user from a plurality of users approaching the unmanned ground vehicle;
   specify which surface of the first surface or second surface, contains the first door or the second door of the first storage compartment or the second storage compartment that stores the package from among the plurality of packages to be received by the estimated next user; and
   adjust a direction of the unmanned ground vehicle based on the specified surface before the estimated next user reaches the unmanned ground vehicle;
   wherein the estimated next user is estimated from among the plurality of users based on whether a face of the estimated next user is recognized in an image captured by a camera or output from a sensor of a portable device owned by the next user;
   adjust the direction of the unmanned ground vehicle based on the direction in which the estimated next user arrives and the specified surface after arriving at the delivery destination.

2. The delivery system according to claim 1, wherein the estimated next user is the next user who receives the package from among the plurality of packages at the unmanned ground vehicle.

3. The delivery system according to claim 2, wherein the next user is estimated after the unmanned ground vehicle arrives at the delivery destination.

4. The delivery system according to claim 1, wherein the plurality of instructions cause the at least one processor to specify a structure around the unmanned ground vehicle and adjust the direction of the unmanned ground vehicle so that a surface different from the specified surface is adjacent to the specified structure.

5. The delivery system according to claim 1, wherein the plurality of instructions cause the at least one processor to acquire a direction in which the estimated next user arrives, and adjust the direction of the unmanned ground vehicle based on the direction in which the estimated next user arrives and the specified surface.

6. The delivery system according to claim 1, wherein the plurality of instructions cause the at least one processor to specify a structure around the unmanned ground vehicle before the unmanned ground vehicle stops at a waiting position in the delivery destination, and adjust the direction of the unmanned ground vehicle so that a surface different from the specified surface is adjacent to the structure.

7. The delivery system according to claim 1, wherein the plurality of instructions cause the at least one processor to authenticate the estimated next user.

8. The delivery system according to claim 1, wherein the plurality of instructions cause the at least one processor to adjust the direction of the unmanned ground vehicle based on the direction in which the next user arrives and the specified surface at the delivery destination.

9. The delivery system according to claim 1, wherein the unmanned ground vehicle is storing a plurality of packages for a plurality of users at the delivery destination.

10. The delivery system according to claim 1, wherein the estimated next user is estimated based on whether the face of the estimated next user is recognized in the image captured by the camera.

11. A delivery method comprising:
    estimating, with at least one processor operating with a memory device in a system, a next user who receives, at a delivery destination, a package from among a plurality of packages from the unmanned ground vehicle as a closest user from a plurality of users approaching an unmanned ground vehicle;
    determining, with the at least one processor operating with the memory device in the system, a first surface provided with a first door of a first storage compartment that stores the package from among the plurality of packages to be received by the estimated next user among the first surface and a second surface, the first and the second surfaces forming an outer periphery of the unmanned ground vehicle, the first and second surfaces facing in different directions and the second surface provided with a second door of a second storage compartment; and
    adjusting, with the at least one processor operating with the memory device in the system, a direction of the unmanned ground vehicle based on the determined surface before the estimated next user reaches the unmanned ground vehicle;
    wherein the first storage compartment and the second storage compartment are collectively configured to store the plurality of packages;
    wherein the estimated next user is estimated from among the plurality of users based on whether a face of the estimated next user is recognized in an image captured by a camera or output from a sensor of a portable device owned by the next user;
    adjusting the direction of the unmanned ground vehicle based on the direction in which the estimated next user arrives and the specified surface after arriving at the delivery destination.

12. A delivery device comprising:
    a first surface and a second surface, provided with a first door of a first storage compartment, and a second door of a second storage compartment respectively, wherein the first storage compartment and the second storage compartment are collectively configured to store a plurality of packages, the first surface and the second surface facing in different directions;
    at least one processor; and at least one memory device that stores a plurality of instructions which, when executed by the at least one processor, causes the at least one processor to:

estimate a next user who receives, at a delivery destination, a package from among the plurality of packages from the delivery device as a closest user from a plurality of users approaching the delivery device;

determine which, of the first surface or the second surface contains the first door or the second door of the first storage compartment or the second storage compartment that stores the package from among the plurality of package to be received by the estimated next user; and adjust a direction of the delivery device based on the determined surface before the estimated next user reaches the delivery device;

wherein the estimated next user is estimated from among the plurality of users based on whether a face of the estimated next user is recognized in an image captured by a camera or output from a sensor of a portable device owned by the next user;

adjust the direction of the unmanned ground vehicle based on the direction in which the estimated next user arrives and the specified surface after arriving at the delivery destination.

* * * * *